United States Patent [19]

Itoh

[11] Patent Number: 4,623,039

[45] Date of Patent: Nov. 18, 1986

[54] SPRING DRIVE

[75] Inventor: Shunichi Itoh, Souka, Japan

[73] Assignee: Nikken Industries Corp., Tokyo, Japan

[21] Appl. No.: 684,365

[22] Filed: Dec. 20, 1984

[30] Foreign Application Priority Data

Dec. 1, 1984 [JP] Japan ................................. 59-181561

[51] Int. Cl.⁴ ........................ F03G 1/08; A63H 29/04; A63H 31/00

[52] U.S. Cl. ............................. 185/39; 185/DIG. 1; 446/464

[58] Field of Search .................... 185/37, 39, DIG. 1; 446/464

[56] References Cited

U.S. PATENT DOCUMENTS 3,919,804  11/1975  Nakata ............................... 446/464
4,077,156  3/1978   Asano ................................. 446/464
4,463,831  8/1984   Wakase ........................... 446/464 X
4,478,313  10/1984  Wakase ..................... 185/DIG. 1 X Primary Examiner—Allan D. Herrmann
Attorney, Agent, or Firm—Huff & Hanson

[57] ABSTRACT

Disclosed herein is a spring drive for use in a moving toy which comprises a windup pinion 5, a spring windup shaft 7 having a gear 6 meshing with the pinion 5, a large gear 8 provided around the spring windup shaft 7, a drive pinion 9 always meshing with the large gear 8, and a spur gear 20 integrally formed with the drive pinion 9, wherein a stepped portion 10 having a larger diameter than that of the gear 6 is formed between the gear 6 of the spring windup shaft and the large gear 8, and one end of the windup pinion 5 is supported by the stepped portion 10 and the spur gear 20 integrally formed with the drive pinion 9, thereby omitting an intermediate partition frame.

4 Claims, 5 Drawing Figures

PRIOR ART

SPRING DRIVE

BACKGROUND OF THE INVENTION (1) Field of the Invention

The present invention relates to a spring drive for use in a moving toy and the like. More particularly, the invention relates to a spring drive in which an intermediate partition frame is omitted, thereby reducing the manufacturing cost thereof by a simple structure.

(2) Description of the Prior Art

A spring drive has been generally used as a driving source in a moving toy which is to be moved by the unwinding action of a spring which has been wound frictionally by rubbing the drive wheel against the floor.

There has been used a conventional spring drive as shown in FIG. 1 comprising a pinion 2 provided around a wheel shaft 1, a spur gear 3 meshing with the pinion 2, a windup pinion 5a always meshing with the spur gear 3 and movably supported by a slit-shaped hole bearing 4a, a spring windup shaft 7a having a gear 6a meshing with the pinion 5a, a large gear 8a provided around the spring windup shaft 7a, a drive pinion 9a always meshing with the large gear 8a and movably supporting by a slit-shaped hole bearing 22a, a right and left side frames 11a and 12a supporting the gear trains, and a partition frame 13 interposed therebetween.

The conventional spring drive thus constructed has the partition frame 13, which is to support one end of the windup pinion 5a and one end of the drive pinion 9a. It is obviously desirable that this partition frame is omitted, because assembling would be easier and a cost reduction can be realized. Thus, in order to omit the partition frame, the windup pinion 5a and the drive pinion 9a must be supported by the right and left frames 11a and 12a. However, this inherently causes the gears to be crushed with one another, and consequently the omission of the partition frame has been impossible.

SUMMARY OF THE INVENTION

It is an object of the present invention to provide a spring drive in which a partition frame is omitted, thereby rendering the assembling easier and reducing the manufacturing cost.

In order to attain the above-mentioned object, according to the present invention, a drive pinion 9 is supported by right and left frames 11 and 12, a stepped portion 10 having a larger diameter than a gear 6 is formed between the gear 6 of a spring windup shaft and a large gear 8, and one end of a windup pinion 5 is supported by the stepped portion 10 and a spur gear 20, thereby omitting the partition frame.

These and other objects, features, and advantages of the present invention will be apparent upon reading of the following description of the invention when taken in connection with the attached drawings with understanding that some modifications, changes and variations could be easily done by those skilled in the art to which the invention pertains without departing from the spirit of the invention or the scope of the appended claims.

DETAILED DESCRIPTION OF THE PREFERRED EMBODIMENT OF THE INVENTION

An preferred embodiment according to the present invention will be explained below with reference to the attached drawings.

Figure 1:
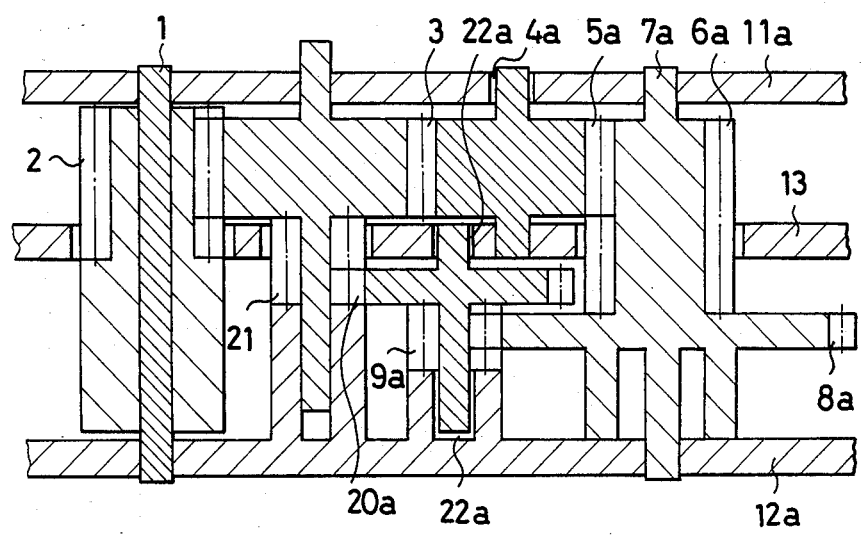
FIG. 1 is a vertically sectional fragmental view of a conventional drive spring.
Figure 2:
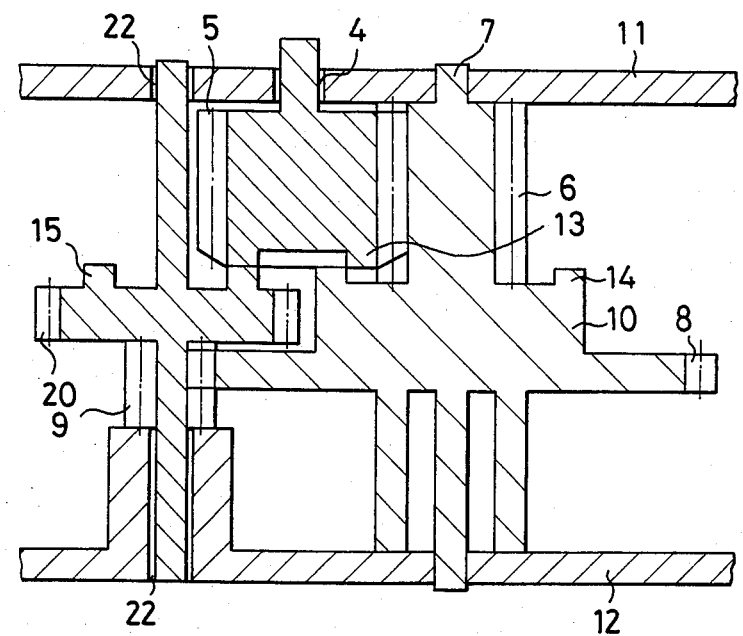
FIG. 2 is a vertically sectional fragmental view illustrating an embodiment of the present invention.
Figure 3:
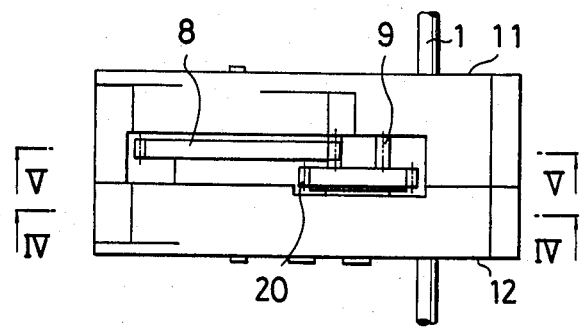
FIG. 3 is a top view of the embodiment of the present invention.
Figure 4:
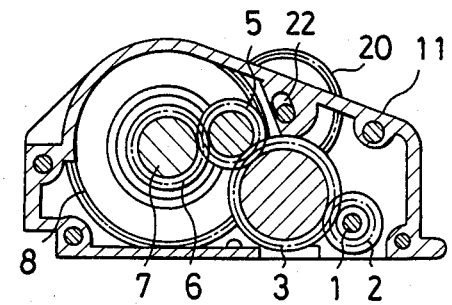
FIG. 4 is a sectional view in FIG. 3 taken along a line IV—IV.
Figure 5:
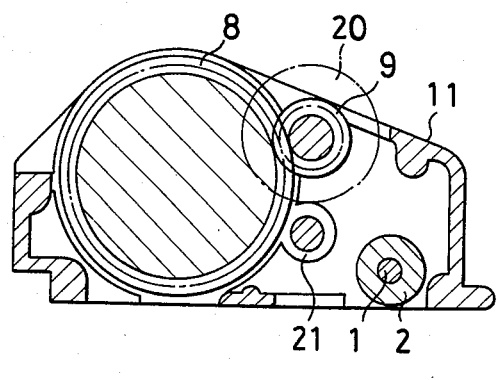
FIG. 5 is a sectional view of FIG. 3 taken along a line V—V.

FIG. 2 is a vertically sectional fragmental view illustrating an embodiment according to the present invention, FIG. 3 is a top view of the embodiment of the invention, and FIG. 4 is a sectional view of FIG. 3 taken along a line IV—IV.

The spring drive according to the present invention comprises a pinion 2 provided around a wheel shaft 1, a spur gear 3 meshing with the pinion 2, a windup pinion 5 always meshing with the spur gear 3 and movably supported by a slit-shaped hole bearing 4, a spring windup shaft 7 having a gear 6 meshing with the pinion 5, a large gear 8 provided around the spring windup shaft 7, a drive pinion 9 always meshing with the large gear 8 and movably supported by a slit-shaped hole bearing 22, a spur gear 20 provided integrally with the drive pinion 9, and a stepped portion 10 having a larger diameter than that of the gear 6 and formed between the gear 6 of the spring windup shaft and the large gear 8. One end of the windup pinion 5 is supported by the stepped portion 10 and the spur gear 20 provided integrally with the drive pinion 9. The other end of the windup pinion is supported by a frame 11, and the opposite ends of each of the other gears are supported by the right and left side frames 11 and 12.

A round recessed portion 13 is formed at the central portion of the contact face of the windup pinion 5 which is in contact with the stepped portion 10 of the spring windup shaft and the spur gear 20, and ring-like projections 14 and 15 are formed at the support faces of the stepped portion 10 and the spur gear 20 respectively which are in contact with the recessed portion. Such construction is to reduce the contact area between the gears and further reduce the friction when the gears rotate, but this is not necessarily indispensable. Other construction may do so long as the gears can be rotated without any trouble. The configurations of the recessed portion and the projections 14 and 15 are not specifically restricted so long as the intended object can be attained.

In the illustrated embodiment, although the spring windup shaft 7 is integrally molded from a plastic material, as a matter of course, this spring windup shaft may be a conventional windup shaft in which, a metal shaft is pushed into a gear.

The function of the thus constructed spring drive according to the present invention will be explained below.

As the wheel shaft 1 is driven in a direction opposite to running direction, the gear 6 around the spring windup shaft is turned by way of the spur gear 3 and the windup pinion 5 to windup the spring. In this state, one end of the windup pinion 5 is supported by the projection 14 of the stepped portion 10 and the projection 15 of the drive pinion, and the rotation of the spur gear 3 is transmitted to the gear 6 of the spring windup shaft without any trouble. In the winding-up of the spring, the large gear 8 is also rotated in a rotational direction in which it is freed with respect to the drive pinion. When the winding-up of the spring is finished, the large gear is rotated by the unwinding force of the spring, while the windup pinion becomes freed by this rotation of the large gear. Thereby, in the same manner as in the conventional device of this type, the wheel shaft 1 is rotated by way of the spur gear 20 integrally formed with the drive pinion 9 and the pinion 21 integrally formed with the spur gear 3.

Since the drive according to the present invention is constructed as mentioned above and is provided with no partition frame, the assembling is easy, and the manufacturing cost is lowered because the constituent parts can be reduced by such omitted partition frame.

What is claimed is:

1. A spring drive for use in a moving toy comprising a windup pinion, a spring windup shaft having a gear meshing with the windup pinion, a large gear provided around the spring windup shaft, a drive pinion always meshing with the large gear, and a spur gear integrally formed with the drive pinion, wherein a stepped portion having a larger diameter than that of the gear is formed between the gear of the spring windup shaft and the large gear, and one end of the windup pinion is supported by the stepped portion and the spur gear integrally formed with the drive pinion.

2. The spring drive according to claim 1 comprising a pinion provided around a shaft, a spur gear meshing with the pinion, the windup pinion always meshing with the spur gear and movably supported by a slit-shaped hole bearing, the spring windup shaft having the gear meshing with the windup pinion, the large gear provided around the spring windup shaft, the drive pinion always meshing with the large gear and movably supported by a slit-shaped hole bearing, the spur gear provided integrally with the drive pinion, and right and left side frames supporting the other end of the windup pinion and the opposite end of each of the other gears.

3. The spring drive according to claim 2, wherein ring-like projections are formed at supporting portions of the stepped portion and the spur gear respectively, and said one end of the windup pinion is supported by the projections.

4. The spring drive according to claim 3, wherein a recessed portion is formed at the contact face of the windup pinion which is in contact with the stepped portion and the spur gear.

* * * * *